(12) United States Patent
Moya

(10) Patent No.: US 6,330,915 B1
(45) Date of Patent: *Dec. 18, 2001

(54) PROTECTION OF DOWNWELL PUMPS FROM SAND ENTRAINED IN PUMPED FLUIDS

(76) Inventor: Emmanuel G. Moya, 9275 North Boyd, Fresno, CA (US) 93720

( * ) Notice: Subject to any disclaimer, the term of this patent is extended or adjusted under 35 U.S.C. 154(b) by 0 days.

This patent is subject to a terminal disclaimer.

(21) Appl. No.: 09/668,806

(22) Filed: Sep. 22, 2000

Related U.S. Application Data

(63) Continuation of application No. 09/135,515, filed on Aug. 15, 1998, now Pat. No. 6,167,960.

(51) Int. Cl.$^7$ .............................. E21B 43/00; E21B 43/38
(52) U.S. Cl. .................... 166/265; 166/105.1; 166/106; 166/311; 166/370; 210/170; 210/747; 417/88; 417/313
(58) Field of Search ................................ 166/105, 105.1, 166/106, 265, 311, 370; 137/888; 210/170, 747; 417/88, 313

(56) References Cited

U.S. PATENT DOCUMENTS

| | | | |
|---|---|---|---|
| Re. 35,454 | * 2/1997 | Cobb | ..................... 166/265 |
| 1,720,863 | 7/1929 | Stebbins . | |
| 2,114,780 | 4/1938 | Juelson . | |
| 2,158,717 | 5/1939 | Brock . | |
| 2,662,486 | 12/1953 | Hillger . | |
| 2,732,032 | 1/1956 | Sandison . | |
| 2,744,721 | 5/1956 | Hatch . | |
| 3,289,608 | 12/1966 | Laval, Jr. . | |
| 3,512,651 | 5/1970 | Laval, Jr. | ........................ 210/512.1 |
| 3,893,918 | * 7/1975 | Favret, Jr. et al. | .............. 166/265 X |
| 3,944,380 | 3/1976 | Krampe . | |
| 3,963,073 | 6/1976 | Laval, Jr. | ......................... 166/105.1 |
| 4,047,912 | 9/1977 | Markland . | |
| 4,066,552 | 1/1978 | Caine | ................................... 210/304 |
| 4,072,481 | 2/1978 | Laval, Jr. . | |
| 4,148,735 | 4/1979 | Laval, Jr. | ........................ 210/512.1 |
| 4,155,681 | 5/1979 | Linko, III et al. . | |
| 4,362,478 | 12/1982 | Huckaby . | |
| 4,555,333 | * 11/1985 | Lavel, Jr. | ............................ 210/113 |
| 4,588,351 | 5/1986 | Miller . | |
| 4,971,518 | 11/1990 | Florin . | |
| 5,000,769 | 3/1991 | Raguideau et al. . | |
| 5,033,545 | 7/1991 | Sodul | .................................. 166/312 |
| 5,277,232 | 1/1994 | Borsheim | .............................. 141/65 |
| 5,368,735 | 11/1994 | Ford | ................................... 210/512.1 |
| 5,553,669 | 9/1996 | Trainer | ............................... 166/105.1 |
| 5,662,167 | 9/1997 | Patterson et al. | .................... 166/265 |
| 6,082,452 | * 7/2000 | Shaw et al. | ....................... 166/105.5 |
| 6,089,322 | * 7/2000 | Kelley et al. | ........................ 166/370 |
| 6,158,512 | * 12/2000 | Unsgaard | ............................ 166/311 |
| 6,167,960 | * 1/2001 | Moya | ............................... 166/105.1 |

* cited by examiner

*Primary Examiner*—George Suchfield
(74) *Attorney, Agent, or Firm*—Fletcher, Yoder & Van Someren

(57) ABSTRACT

A system for separating particulates from a liquid prior to pumping of the liquid. The system is amenable to use, for example, in a wellbore environment for separating sand or other particulate matter from a production fluid. The system uses a sand separator, a submersible pump and a mechanism for reinjecting the particulate matter downstream of the pump discharge. This permits the sand and other particulates to be routed around the pump to reduce the potentially detrimental effects of such particulate matter on certain pumps.

9 Claims, 2 Drawing Sheets

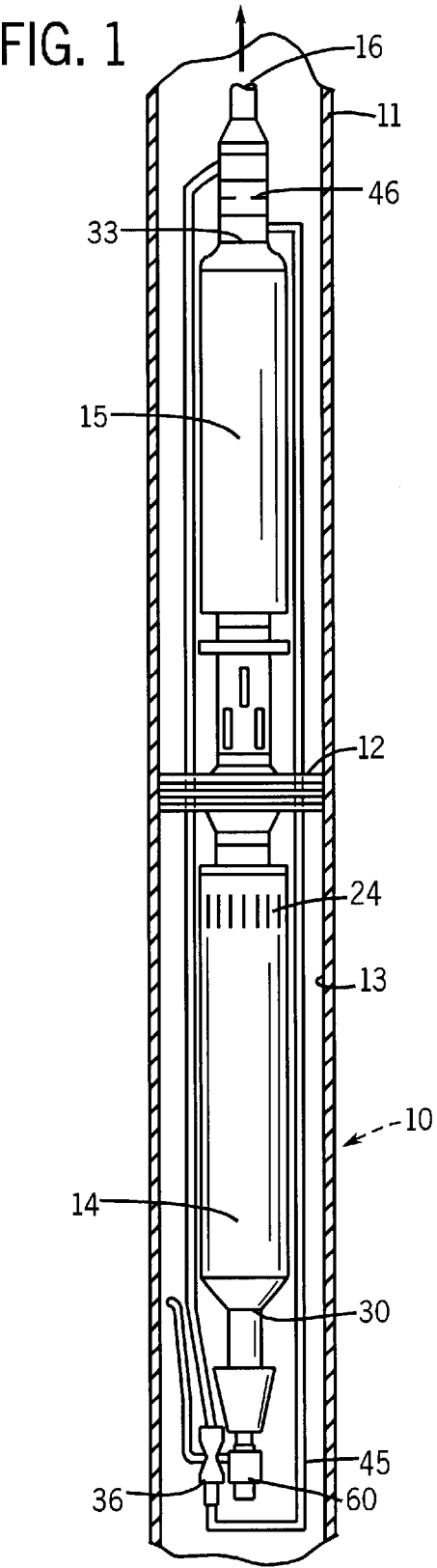
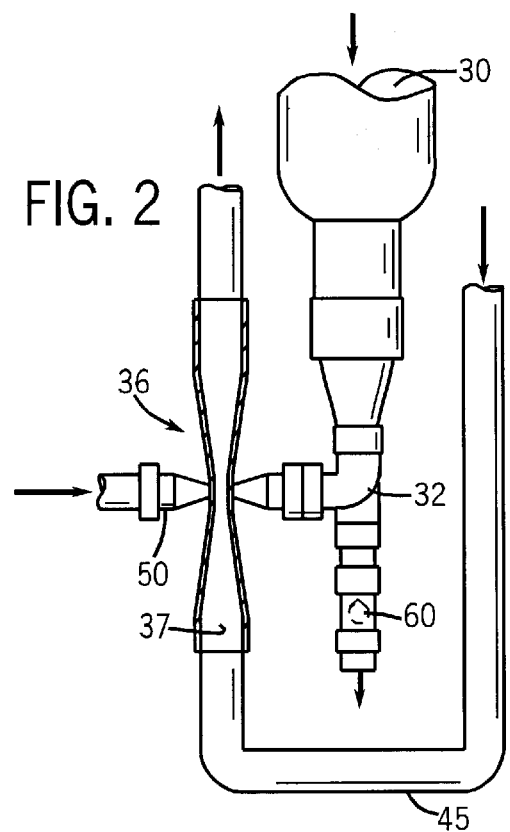
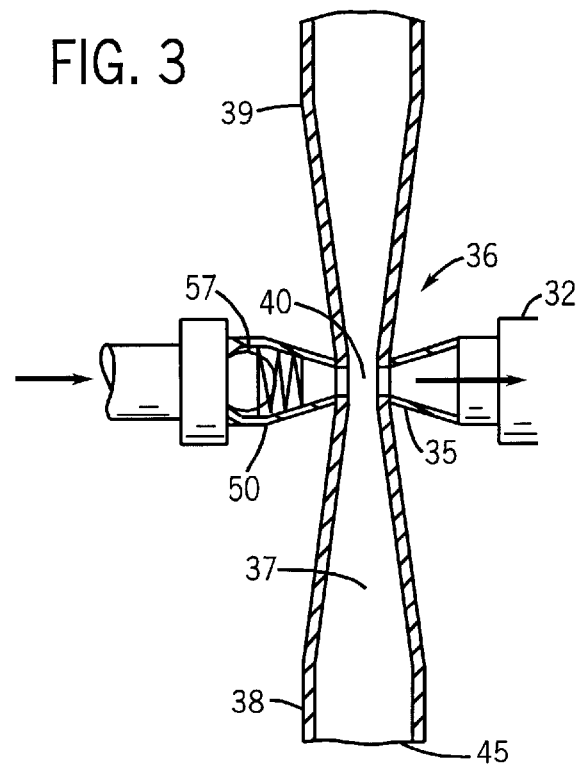

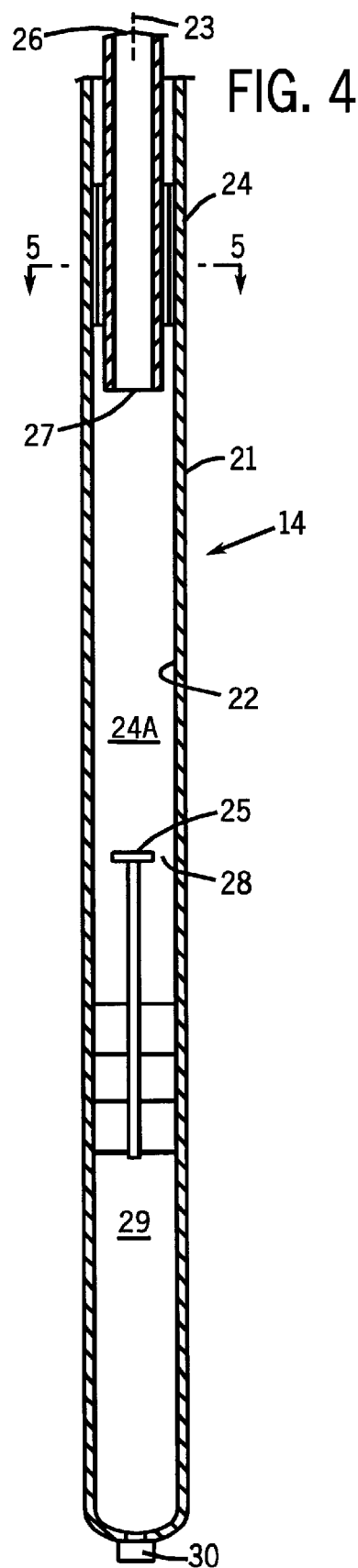
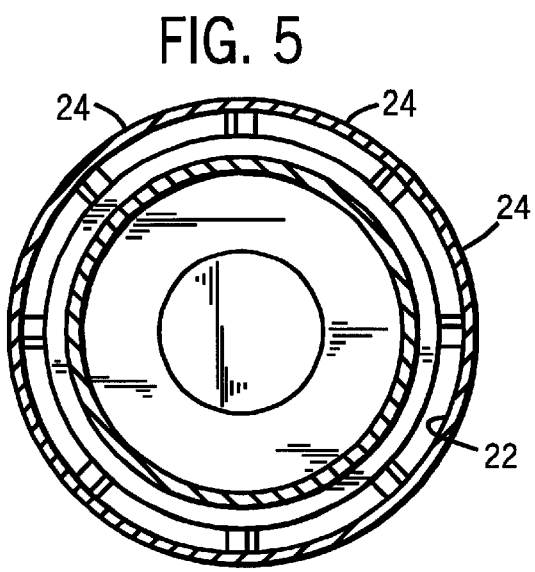

PROTECTION OF DOWNWELL PUMPS FROM SAND ENTRAINED IN PUMPED FLUIDS

This application is a continuation of application Ser. No. 09/135,515, filed Aug. 15, 1998, now U.S. Pat. No. 6,167,960.

FIELD OF THE INVENTION

Protection of downwell pumps from damage by sand which is entrained in fluids to be pumped, for example oil or water from oil wells and water wells in sandy formations.

BACKGROUND OF THE INVENTION

Downwell pumps are placed in a well near its bottom, for providing pressure to move well fluid to the surface. Examples are oil wells and water wells, where the pump draws well fluids from the surrounding formation. Commonly such formations include sand which abrasively wears the pump structure when it passes through the pump. This requires much more frequent pump service than if the pump were pumping a similar fluid without sand in it.

Removal and replacement of a downwell pump is costly both in labor and in production lost due to down time of the well.

The usefulness of screens to protect the pump is more theoretical than actual because of the tendency of screens to clog. Centrifugal separators have proved to be far superior for downhole work, and are exemplified for this purpose by Laval Jr. U.S. Pat. Nos. 3,289,608 and 4,072,481, which are incorporated herein by reference in their entirety for their showing of useful structures and utility.

While these show a suitably effective separation of sand ahead of the inlet of the pump, they leave unsolved the optimum disposition of the separated sand. In one embodiment the sand is simply returned to the well, where it can contribute to plugging the formation.

In another, the sand is flushed from a T into a fluid stream that joins the output fluid from the pump on its way to the surface. The problem faced by this arrangement is the possibility that the sand outlet may become plugged or overloaded. In that event, the system will have to be raised to the surface and cleaned out. This is an expensive situation which is intended to be avoided by this invention.

BRIEF DESCRIPTION OF THE INVENTION

A system according to this invention includes a centrifugal separator of the type which has an internal cylindrical wall along which a rapid flow of fluid circulates in a helical pattern from an inlet port that directs the rapidly flowing stream tangentially along the cylindrical wall. This flow continues until it encounters a spin plate.

The spin plate reverses the axial direction of stream flow which then flows centrally in the opposite direction to and out of an outlet port. Sand that is moved toward the wall by the centrifugal force flows through a gap near the spin plate, and into a lower sand collection chamber, accompanied by some liquid to form a sand-enriched flow. The pump draws the sand-free flow from the outlet port of the separator. This results in an incoming flow of sand-laden fluid into the inlet port of the separator.

According to a feature of this invention, an ejector having a flow passage with a reduced injector section and an ejection port into it, receives a pumped flow of sand free liquid from the pump through a conduit that receives liquid from the pump outlet and returns it to the effluent stream. The ejection port is connected to the outlet from the sand collection chamber. A backflush nozzle is spaced from and faces the injection port to direct a liquid stream into it in the event it is clogged.

According to a preferred but optional feature of the invention, a check valve communicating with the outlet port of the sand collection chamber diverts sand from the ejector port in the event the injection port or the outlet becomes clogged.

There results a sand separator system which is resistant to clogging, while protecting the pump from sand.

The above and other features of this invention will be fully understood from the following detailed description and the accompanying drawings, in which:

BRIEF DESCRIPTION OF THE DRAWINGS

FIG. 1 is a vertical, axial view partly in cross-section showing the presently preferred embodiment of the invention;

FIG. 2 is a fragmentary view of a lower portion of FIG. 1, partly in cross section;

FIG. 3 is an enlarged view of a portion of FIG. 2;

FIG. 4 is an axial cross-section of the separators; and

FIG. 5 is a cross-section taken at line 5—5 in FIG. 4.

DETAILED DESCRIPTION OF THE INVENTION

A pump protection system 10 according to this invention is shown installed in a well casing 11 that receives well fluids through perforations (not shown) in its wall, or through the bottom open end of the casing. A packer 12 forms a fluid seal between the inside wall 13 of the casing and the outside wall of a centrifugal separator 14. The pumping of fluids from beneath the packer to the surface is the objective of the system.

A downwell pump 15 is connected to the separator. A production pipe 16 connected to the pump conveys pumped fluid to the surface.

The pump is driven by any suitable device, usually an electric motor (not shown). This motor provide the energy for the entire system.

The separator 14 is a classic centrifugal type such as shown in Laval Jr. U.S. Pat. No. 4,072,481, which is incorporated herein and made part hereof by reference in its entirety for its showing of the construction theory, and operation of such a separator. FIGS. 4 and 5 will be recognized in this patent. As best shown in FIG. 4, it has an elongated body 21 with an internal cylindrical wall 22 extending along a central axis 23.

An slit-like entry nozzles 24 through the wall of the casing are directed tangentially along wall 22. The nozzles are located near the top of a separator chamber 24A so that liquid flows helically at a high speed down the wall until it strikes a spin plate 25. When the rapidly rotating stream strides the spin plate, it continues its rotating motion, but reverses its axial direction so that it flows as a central stream inside the downwardly progressing stream and flows out an upper central outlet port 26 in an outlet tube 27.

As the consequence of the rapid velocity of the downward stream, the sand, which has a larger specific gravity than the fluid, migrates toward the wall where the stream reaches the spin plate there is a peripheral gap 28 around the plate. The sand accompanied by some fluid, flows through this gap into a sand collection chamber 29. A collection chamber outlet 30 is formed at the bottom of the collection chamber.

Pump inlet 34 (FIG. 1) is connected to outlet port 26 of the separator to draw fluid from the separator and drive it upwardly through production pipe 16. This movement of fluid causes the incoming flow through the nozzles, and thereby drives the separator.

A sand by-pass ejector conduit 32 (FIG. 2) discharges sand laden liquid from outlet 30 into injector port 35 of an ejector 36. Ejector 36 is a conventional venturi type having a flow passage 37 from its inlet end 38 to its outlet end 39. Conduit 32 drains sand-laden liquid from the collection chamber to the injector port. The ejector includes a reduced section 40 into which the ejector port opens. A reduced pressure in section 40 draws the sand-laden stream into the flow through passage 37.

A sand by-pass conduit 45 draws liquid under pressure from the pump outlet, and discharges into the ejector's flow passage. It continues to discharge into the effluent stream from the pump to join the outlet stream to the surface. An orifice plate 46 is placed in the effluent stream between the points of entry and re-entry of the sand by-pass conduit to provide a differential pressure that will drive the liquid stream through the ejector.

A flush nozzle 50 discharges into reduced section 40 directly toward ejector port 35. It is supplied by a source (not shown) of water under pressure to provide a stream to clear the injector port of sand. A spring loaded ball check valve 51 is loaded closed and will remain closed unless the pressure in the reduced section drops, perhaps by 5 psi below the equivalent head of water for that depth. Then it will open and back flush the ejector port.

Also, and optionally, should the system become even more clogged, a spring loaded check valve 60 below the exit port from the sand collection chamber will open when the pressure exceeds that which is normal. This sand laden material will be discharged directly into the well.

The result of this arrangement is that the pump works only on sand free fluid, and the entire production (including the sand) is lifted to the surface. Pump wear from sand is virtually eliminated.

This invention is not to be limited by the embodiment shown in the drawings and described in the description, which is given by way of example and not of limitation, but only in accordance with the scope of the appended claims.

What is claimed is:

1. A system to reduce an amount of sand from fluid flowing through a submersible pump, comprising:
    a sand separator that separates a portion of sand from a wellbore fluid;
    a submersible pump that draws fluid minus the portion of sand from the sand separator;
    a flow divider that receives and divides the fluid discharged from the submersible pump into a primary fluid flow and a secondary fluid flow;
    a sand ejector having a pressure reduction device that entrains separated sand from the sand separator into the secondary fluid flow; and
    a flow merging device that merges the secondary fluid flow and separated sand into the primary fluid flow, the sand ejector comprising:
        a pressure reduction section, having an inlet, an outlet, and a reduced pressure region, wherein a fluid entering the device through the inlet is reduced in pressure in the reduced pressure region;
        a sand nozzle disposed adjacent the reduced pressure region to draw a sand-laden liquid from the sand separator into the secondary fluid flow at the reduced pressure region; and
        a flush nozzle, wherein a flush liquid may be discharged into the sand ejector.

2. The system as recited in claim 1, the flush nozzle comprising a check valve, wherein when the check valve is unseated liquid from the source of liquid flows into the sand ejector.

3. The system as recited in claim 1, wherein the sand separator is a centrifugal separator.

4. The system as recited in claim 1, the system comprising a flow orifice, wherein the flow orifice produces a differential pressure in the primary fluid flow that provides a driving force for the secondary fluid flow.

5. A system to reduce an amount of sand from fluid flowing through a submersible pump, comprising:
    a sand separator that separates a portion of sand from a wellbore fluid;
    a submersible pump that draws fluid minus the portion of sand from the sand separator;
    a flow divider that receives and divides the fluid discharged from the submersible pump into a primary fluid flow and a secondary fluid flow;
    a sand ejector having a pressure reduction device that entrains separated sand from the sand separator into the secondary fluid flow;
    a flow merging device that merges the secondary fluid flow and separated sand into the primary fluid flow; and
    a relief valve, wherein the relief valve opens when the pressure on the separated sand at the sand separator exceeds a predetermined amount, directing the separated sand away from the sand nozzle.

6. The system as recited in claim 5, wherein the sand separator comprises a centrifugal separator.

7. The system as recited in claim 6, further comprising a flow orifice, wherein the flow orifice produces a differential pressure in the primary fluid flow that provides a driving force for the secondary fluid flow.

8. A method of separating a portion of sand from wellbore fluid prior to pumping the wellbore fluid through a submersible pump, comprising:
    drawing a wellbore fluid through a sand separator via a submersible pump;
    separating sand from the wellbore fluid prior to the wellbore fluid entering the submersible pump;
    separating a portion of fluid from a primary fluid flow discharged from the submersible pump;
    utilizing a pressure reduction device to entrain a portion of sand separated by the sand separator into the portion of fluid;
    reintroducing the portion of fluid and the portion of sand into the primary fluid flow; and
    using a pressure relief valve to divert sand from the pressure reduction device into the wellbore should the pressure reduction device become clogged with sand.

9. The method as recited in claim 8, further comprising:
    flushing the pressure reduction device with liquid to unclog sand from the pressure reduction device.

* * * * *